United States Patent
Hirano et al.

(10) Patent No.: US 12,509,674 B2
(45) Date of Patent: Dec. 30, 2025

(54) PHOTOACTIVATED ADENYLYL CYCLASE

(71) Applicant: HAMAMATSU PHOTONICS K.K., Hamamatsu (JP)

(72) Inventors: Minako Hirano, Hamamatsu (JP); Shigeru Matsunaga, Hamamatsu (JP); Masumi Takebe, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 1018 days.

(21) Appl. No.: 17/624,373

(22) PCT Filed: Apr. 14, 2020

(86) PCT No.: PCT/JP2020/016461
§ 371 (c)(1),
(2) Date: Jan. 3, 2022

(87) PCT Pub. No.: WO2021/005862
PCT Pub. Date: Jan. 14, 2021

(65) Prior Publication Data
US 2022/0356460 A1    Nov. 10, 2022

(30) Foreign Application Priority Data
Jul. 11, 2019  (JP) ................. 2019-129374

(51) Int. Cl.
*C12N 9/88* (2006.01)

(52) U.S. Cl.
CPC ........ *C12N 9/88* (2013.01); *C12Y 406/01001* (2013.01)

(58) Field of Classification Search
CPC .... C12N 15/74; C12N 2800/90; C12N 15/63; C12Y 406/01001
USPC ...................................................... 435/69.1
See application file for complete search history.

(56) References Cited

FOREIGN PATENT DOCUMENTS

| CN | 103898160 A | 7/2014 |
|---|---|---|
| JP | 2017-007949 A | 1/2017 |
| WO | WO-2018/140456 A1 | 8/2018 |
| WO | WO-2019/071048 A1 | 4/2019 |

OTHER PUBLICATIONS

Mio Ohiki, et al., "Molecular mechanism of photoactivation of a light-regulated adenylate cyclase", Proceedings of the National Academy of Sciences, vol. 114, No. 32,, Jul. 24, 2017, p. 8562-p. 8567.

Yu Duowei et al., "Molecular Biology,", Nanjing Normal University Press, Jul. 31, 2007, p. 133-p. 138, including English language translation.

Chaloupka James A. et al, "Autoinhibitory regulation of soluble adenylyl cyclase", Molecular Reproduction and Development New York, NY, US ISSN: 1040-452X, DOI: 10.1002/mrd.20409, Mar. 1, 2006 vol. 73, No. 3, p. 361-p. 368, XP093051393.

Steegborn Clemens, "Structure,mechanism, and regulation of soluble adenylyl cyclases—similarities and differences to transmembrane adenylyl cyclases", Biochimica Et Biophysica Acta. Molecular Basis of Disease NL ISSN: 0925-4439, DOI:10.1016/j.bbadis.2014. 08.012, Dec. 1, 2014 vol. 1842,No. 12 , p. 2535-p. 2547, XP093051407.

Qi Chao et al, "The structure of a membrane adenylyl cyclase bound to an activated stimulatory G protein", Science US ISSN: 0036-8075, DOI: 10.1126/science.aav0778 Retrieved from the Internet: URL:http://dx.doi.org/10.1126/science.aav0778>, Apr. 26, 2019 vol. 364, No. 6438, p. 389-p. 394, XP093051410.

Gugger, M. et al. "family 3 adenylate cyclase [Oscillatoria acuminata PCC 6304," Accession No. YP_007087096, Database GenBank [online], [retrieved on Apr. 6, 2023], URL: https://www.ncbi.nlm.nih.gov/protein/YP_007087096.1?report=genpept, 2014.

International Preliminary Report on Patentability mailed Jan. 20, 2022 for PCT/JP2020/016461.

"AFY83176.1", GenBank, Mar. 6, 2013, 2 pages.

5X4T_A, "Chain A, Photoactivated Adenylyl Cyclase", Genbank, Jul. 26, 2017.

Crasnier, M. et al., "The catalytic domain of *Escherichia coli* K-12 adenylate cyclase as revealed by deletion analysis of the *cya* gene," Mol Gen Genet, 1994, vol. 243, pp. 409-416.

Hirano, M. et al., "The C-terminal region affects the activity of photoactivated adenylyl cyclase from *Oscillatoria acuminata*," Scientific Reports, Dec. 30, 2019, 9:20262.

Iseki, M. et al., "A blue-light-activated adenylyl cyclase mediates photoavoidance in *Euglena gracilis*," Nature, 2002, vol. 415, pp. 1047-1051.

Ohki, M. et al., "Structural insight into photoactivation of an adenylate cyclase from a photosynthetic cyanobacterium," Proc. Natl. Acad. Sci. U.S.A., 2016, vol. 113, No. 24, pp. 6659-6664.

*Primary Examiner* — Tekchand Saidha
*Assistant Examiner* — Mohammad Y Meah
(74) *Attorney, Agent, or Firm* — Faegre Drinker Biddle & Reath LLP

(57) ABSTRACT

A protein according to one embodiment of the present invention has a photoactivated adenylyl cyclase activity, and consists of the amino acid sequence of SEQ ID No. 1 with 1-18 amino acid residues deleted from the C-terminus, or an amino acid sequence having 90% or more sequence identity therewith. According to the present invention, a novel photoactivated adenylyl cyclase having a higher photoactivation efficiency compared to a wild-type OaPAC protein can be provided.

8 Claims, 2 Drawing Sheets
Specification includes a Sequence Listing.

*Fig.1*

SEQUENCE LISTING

```
<160> NUMBER OF SEQ ID NOS: 10

<210> SEQ ID NO 1
<211> LENGTH: 366
<212> TYPE: PRT
<213> ORGANISM: Oscillatoria acuminata
```

```
<400> SEQUENCE: 1

Met Lys Arg Leu Thr Tyr Ile Ser Lys Phe Ser Arg Pro Leu Ser Gly
1               5                   10                  15

Asp Glu Ile Glu Ala Ile Gly Arg Ile Ser Ser Gln Lys Asn Gln Gln
            20                  25                  30

Ala Asn Val Thr Gly Val Leu Leu Cys Leu Asp Gly Ile Phe Phe Gln
        35                  40                  45

Ile Leu Glu Gly Glu Ala Glu Lys Ile Asp Arg Ile Tyr Glu Arg Ile
    50                  55                  60

Leu Ala Asp Glu Arg His Thr Asp Ile Leu Cys Leu Lys Ser Glu Val
65                  70                  75                  80

Glu Val Gln Glu Arg Met Phe Pro Asp Trp Ser Met Gln Thr Ile Asn
                85                  90                  95

Leu Asp Glu Asn Thr Asp Phe Leu Ile Arg Pro Ile Lys Val Leu Leu
            100                 105                 110

Gln Thr Leu Thr Glu Ser His Arg Ile Leu Glu Lys Tyr Thr Gln Pro
        115                 120                 125

Ser Ile Phe Lys Ile Ile Ser Gln Gly Thr Asn Pro Leu Asn Ile Arg
    130                 135                 140

Pro Lys Ala Val Glu Lys Ile Val Phe Phe Ser Asp Ile Val Ser Phe
145                 150                 155                 160

Ser Thr Phe Ala Glu Lys Leu Pro Val Glu Glu Val Val Ser Val Val
                165                 170                 175

Asn Ser Tyr Phe Ser Val Cys Thr Ala Ile Ile Thr Arg Gln Gly Gly
            180                 185                 190

Glu Val Thr Lys Phe Ile Gly Asp Cys Val Met Ala Tyr Phe Asp Gly
        195                 200                 205

Asp Cys Ala Asp Gln Ala Ile Gln Ala Ser Leu Asp Ile Leu Met Glu
    210                 215                 220

Leu Glu Ile Leu Arg Asn Ser Ala Pro Glu Gly Ser Pro Leu Arg Val
225                 230                 235                 240

Leu Tyr Ser Gly Ile Gly Leu Ala Lys Gly Lys Val Ile Glu Gly Asn
                245                 250                 255

Ile Gly Ser Glu Leu Lys Arg Asp Tyr Thr Ile Leu Gly Asp Ala Val
            260                 265                 270

Asn Val Ala Ala Arg Leu Glu Ala Leu Thr Arg Gln Leu Ser Gln Ala
        275                 280                 285

Leu Val Phe Ser Ser Glu Val Lys Asn Ser Ala Thr Lys Ser Trp Asn
    290                 295                 300

Phe Ile Trp Leu Thr Asp Ser Glu Leu Lys Gly Lys Ser Glu Ser Ile
305                 310                 315                 320

Asp Ile Tyr Ser Ile Asp Asn Glu Met Thr Arg Lys Ser Ser Gly Gly
                325                 330                 335

Leu Glu Ile Ala Arg Asn Ile Gly His Tyr Leu Glu Arg Val Gly Asp
            340                 345                 350

Arg Gln Pro Ser Gln Ile Phe Gly Val Lys Ser Leu Pro Leu
        355                 360                 365

<210> SEQ ID NO 2
<211> LENGTH: 363
<212> TYPE: PRT
<213> ORGANISM: artificial sequence
<220> FEATURE:
<223> OTHER INFORMATION: Oa-363
```

<400> SEQUENCE: 2

```
Met Lys Arg Leu Thr Tyr Ile Ser Lys Phe Ser Arg Pro Leu Ser Gly
1               5                   10                  15

Asp Glu Ile Glu Ala Ile Gly Arg Ile Ser Ser Gln Lys Asn Gln Gln
            20                  25                  30

Ala Asn Val Thr Gly Val Leu Leu Cys Leu Asp Gly Ile Phe Phe Gln
        35                  40                  45

Ile Leu Glu Gly Glu Ala Glu Lys Ile Asp Arg Ile Tyr Glu Arg Ile
    50                  55                  60

Leu Ala Asp Glu Arg His Thr Asp Ile Leu Cys Leu Lys Ser Glu Val
65                  70                  75                  80

Glu Val Gln Glu Arg Met Phe Pro Asp Trp Ser Met Gln Thr Ile Asn
                85                  90                  95

Leu Asp Glu Asn Thr Asp Phe Leu Ile Arg Pro Ile Lys Val Leu Leu
            100                 105                 110

Gln Thr Leu Thr Glu Ser His Arg Ile Leu Glu Lys Tyr Thr Gln Pro
        115                 120                 125

Ser Ile Phe Lys Ile Ile Ser Gln Gly Thr Asn Pro Leu Asn Ile Arg
    130                 135                 140

Pro Lys Ala Val Glu Lys Ile Val Phe Phe Ser Asp Ile Val Ser Phe
145                 150                 155                 160

Ser Thr Phe Ala Glu Lys Leu Pro Val Glu Glu Val Val Ser Val Val
                165                 170                 175

Asn Ser Tyr Phe Ser Val Cys Thr Ala Ile Ile Thr Arg Gln Gly Gly
            180                 185                 190

Glu Val Thr Lys Phe Ile Gly Asp Cys Val Met Ala Tyr Phe Asp Gly
        195                 200                 205

Asp Cys Ala Asp Gln Ala Ile Gln Ala Ser Leu Asp Ile Leu Met Glu
    210                 215                 220

Leu Glu Ile Leu Arg Asn Ser Ala Pro Glu Gly Ser Pro Leu Arg Val
225                 230                 235                 240

Leu Tyr Ser Gly Ile Gly Leu Ala Lys Gly Lys Val Ile Glu Gly Asn
                245                 250                 255

Ile Gly Ser Glu Leu Lys Arg Asp Tyr Thr Ile Leu Gly Asp Ala Val
            260                 265                 270

Asn Val Ala Ala Arg Leu Glu Ala Leu Thr Arg Gln Leu Ser Gln Ala
        275                 280                 285

Leu Val Phe Ser Ser Glu Val Lys Asn Ser Ala Thr Lys Ser Trp Asn
    290                 295                 300

Phe Ile Trp Leu Thr Asp Ser Glu Leu Lys Gly Lys Ser Glu Ser Ile
305                 310                 315                 320

Asp Ile Tyr Ser Ile Asp Asn Glu Met Thr Arg Lys Ser Ser Gly Gly
                325                 330                 335

Leu Glu Ile Ala Arg Asn Ile Gly His Tyr Leu Glu Arg Val Gly Asp
            340                 345                 350

Arg Gln Pro Ser Gln Ile Phe Gly Val Lys Ser
        355                 360
```

<210> SEQ ID NO 3
<211> LENGTH: 360
<212> TYPE: PRT
<213> ORGANISM: artificial sequence
<220> FEATURE:
<223> OTHER INFORMATION: Oa-360

<400> SEQUENCE: 3

```
Met Lys Arg Leu Thr Tyr Ile Ser Lys Phe Ser Arg Pro Leu Ser Gly
1               5                   10                  15

Asp Glu Ile Glu Ala Ile Gly Arg Ile Ser Ser Gln Lys Asn Gln Gln
            20                  25                  30

Ala Asn Val Thr Gly Val Leu Leu Cys Leu Asp Gly Ile Phe Phe Gln
        35                  40                  45

Ile Leu Glu Gly Glu Ala Glu Lys Ile Asp Arg Ile Tyr Glu Arg Ile
    50                  55                  60

Leu Ala Asp Glu Arg His Thr Asp Ile Leu Cys Leu Lys Ser Glu Val
65                  70                  75                  80

Glu Val Gln Glu Arg Met Phe Pro Asp Trp Ser Met Gln Thr Ile Asn
                85                  90                  95

Leu Asp Glu Asn Thr Asp Phe Leu Ile Arg Pro Ile Lys Val Leu Leu
            100                 105                 110

Gln Thr Leu Thr Glu Ser His Arg Ile Leu Glu Lys Tyr Thr Gln Pro
        115                 120                 125

Ser Ile Phe Lys Ile Ile Ser Gln Gly Thr Asn Pro Leu Asn Ile Arg
    130                 135                 140

Pro Lys Ala Val Glu Lys Ile Val Phe Phe Ser Asp Ile Val Ser Phe
145                 150                 155                 160

Ser Thr Phe Ala Glu Lys Leu Pro Val Glu Glu Val Val Ser Val Val
                165                 170                 175

Asn Ser Tyr Phe Ser Val Cys Thr Ala Ile Ile Thr Arg Gln Gly Gly
            180                 185                 190

Glu Val Thr Lys Phe Ile Gly Asp Cys Val Met Ala Tyr Phe Asp Gly
        195                 200                 205

Asp Cys Ala Asp Gln Ala Ile Gln Ala Ser Leu Asp Ile Leu Met Glu
    210                 215                 220

Leu Glu Ile Leu Arg Asn Ser Ala Pro Glu Gly Ser Pro Leu Arg Val
225                 230                 235                 240

Leu Tyr Ser Gly Ile Gly Leu Ala Lys Gly Lys Val Ile Glu Gly Asn
                245                 250                 255

Ile Gly Ser Glu Leu Lys Arg Asp Tyr Thr Ile Leu Gly Asp Ala Val
            260                 265                 270

Asn Val Ala Ala Arg Leu Glu Ala Leu Thr Arg Gln Leu Ser Gln Ala
        275                 280                 285

Leu Val Phe Ser Ser Glu Val Lys Asn Ser Ala Thr Lys Ser Trp Asn
    290                 295                 300

Phe Ile Trp Leu Thr Asp Ser Glu Leu Lys Gly Lys Ser Glu Ser Ile
305                 310                 315                 320

Asp Ile Tyr Ser Ile Asp Asn Glu Met Thr Arg Lys Ser Ser Gly Gly
                325                 330                 335

Leu Glu Ile Ala Arg Asn Ile Gly His Tyr Leu Glu Arg Val Gly Asp
            340                 345                 350

Arg Gln Pro Ser Gln Ile Phe Gly
        355                 360

<210> SEQ ID NO 4
<211> LENGTH: 357
<212> TYPE: PRT
<213> ORGANISM: artificial sequence
<220> FEATURE:
<223> OTHER INFORMATION: Oa-357
```

<400> SEQUENCE: 4

```
Met Lys Arg Leu Thr Tyr Ile Ser Lys Phe Ser Arg Pro Leu Ser Gly
1               5                   10                  15

Asp Glu Ile Glu Ala Ile Gly Arg Ile Ser Ser Gln Lys Asn Gln Gln
            20                  25                  30

Ala Asn Val Thr Gly Val Leu Leu Cys Leu Asp Gly Ile Phe Phe Gln
        35                  40                  45

Ile Leu Glu Gly Glu Ala Glu Lys Ile Asp Arg Ile Tyr Glu Arg Ile
    50                  55                  60

Leu Ala Asp Glu Arg His Thr Asp Ile Leu Cys Leu Lys Ser Glu Val
65                  70                  75                  80

Glu Val Gln Glu Arg Met Phe Pro Asp Trp Ser Met Gln Thr Ile Asn
                85                  90                  95

Leu Asp Glu Asn Thr Asp Phe Leu Ile Arg Pro Ile Lys Val Leu Leu
            100                 105                 110

Gln Thr Leu Thr Glu Ser His Arg Ile Leu Glu Lys Tyr Thr Gln Pro
        115                 120                 125

Ser Ile Phe Lys Ile Ile Ser Gln Gly Thr Asn Pro Leu Asn Ile Arg
    130                 135                 140

Pro Lys Ala Val Glu Lys Ile Val Phe Phe Ser Asp Ile Val Ser Phe
145                 150                 155                 160

Ser Thr Phe Ala Glu Lys Leu Pro Val Glu Glu Val Val Ser Val Val
                165                 170                 175

Asn Ser Tyr Phe Ser Val Cys Thr Ala Ile Ile Thr Arg Gln Gly Gly
            180                 185                 190

Glu Val Thr Lys Phe Ile Gly Asp Cys Val Met Ala Tyr Phe Asp Gly
        195                 200                 205

Asp Cys Ala Asp Gln Ala Ile Gln Ala Ser Leu Asp Ile Leu Met Glu
    210                 215                 220

Leu Glu Ile Leu Arg Asn Ser Ala Pro Glu Gly Ser Pro Leu Arg Val
225                 230                 235                 240

Leu Tyr Ser Gly Ile Gly Leu Ala Lys Gly Lys Val Ile Glu Gly Asn
                245                 250                 255

Ile Gly Ser Glu Leu Lys Arg Asp Tyr Thr Ile Leu Gly Asp Ala Val
            260                 265                 270

Asn Val Ala Ala Arg Leu Glu Ala Leu Thr Arg Gln Leu Ser Gln Ala
        275                 280                 285

Leu Val Phe Ser Ser Glu Val Lys Asn Ser Ala Thr Lys Ser Trp Asn
    290                 295                 300

Phe Ile Trp Leu Thr Asp Ser Glu Leu Lys Gly Lys Ser Glu Ser Ile
305                 310                 315                 320

Asp Ile Tyr Ser Ile Asp Asn Glu Met Thr Arg Lys Ser Ser Gly Gly
                325                 330                 335

Leu Glu Ile Ala Arg Asn Ile Gly His Tyr Leu Glu Arg Val Gly Asp
            340                 345                 350

Arg Gln Pro Ser Gln
        355
```

<210> SEQ ID NO 5
<211> LENGTH: 354
<212> TYPE: PRT
<213> ORGANISM: artificial sequence
<220> FEATURE:
<223> OTHER INFORMATION: Oa-354

<400> SEQUENCE: 5

```
Met Lys Arg Leu Thr Tyr Ile Ser Lys Phe Ser Arg Pro Leu Ser Gly
1               5                   10                  15

Asp Glu Ile Glu Ala Ile Gly Arg Ile Ser Ser Gln Lys Asn Gln Gln
            20                  25                  30

Ala Asn Val Thr Gly Val Leu Leu Cys Leu Asp Gly Ile Phe Phe Gln
        35                  40                  45

Ile Leu Glu Gly Glu Ala Glu Lys Ile Asp Arg Ile Tyr Glu Arg Ile
    50                  55                  60

Leu Ala Asp Glu Arg His Thr Asp Ile Leu Cys Leu Lys Ser Glu Val
65                  70                  75                  80

Glu Val Gln Glu Arg Met Phe Pro Asp Trp Ser Met Gln Thr Ile Asn
                85                  90                  95

Leu Asp Glu Asn Thr Asp Phe Leu Ile Arg Pro Ile Lys Val Leu Leu
            100                 105                 110

Gln Thr Leu Thr Glu Ser His Arg Ile Leu Glu Lys Tyr Thr Gln Pro
        115                 120                 125

Ser Ile Phe Lys Ile Ile Ser Gln Gly Thr Asn Pro Leu Asn Ile Arg
    130                 135                 140

Pro Lys Ala Val Glu Lys Ile Val Phe Phe Ser Asp Ile Val Ser Phe
145                 150                 155                 160

Ser Thr Phe Ala Glu Lys Leu Pro Val Glu Glu Val Val Ser Val Val
                165                 170                 175

Asn Ser Tyr Phe Ser Val Cys Thr Ala Ile Ile Thr Arg Gln Gly Gly
            180                 185                 190

Glu Val Thr Lys Phe Ile Gly Asp Cys Val Met Ala Tyr Phe Asp Gly
        195                 200                 205

Asp Cys Ala Asp Gln Ala Ile Gln Ala Ser Leu Asp Ile Leu Met Glu
    210                 215                 220

Leu Glu Ile Leu Arg Asn Ser Ala Pro Glu Gly Ser Pro Leu Arg Val
225                 230                 235                 240

Leu Tyr Ser Gly Ile Gly Leu Ala Lys Gly Lys Val Ile Glu Gly Asn
                245                 250                 255

Ile Gly Ser Glu Leu Lys Arg Asp Tyr Thr Ile Leu Gly Asp Ala Val
            260                 265                 270

Asn Val Ala Ala Arg Leu Glu Ala Leu Thr Arg Gln Leu Ser Gln Ala
        275                 280                 285

Leu Val Phe Ser Ser Glu Val Lys Asn Ser Ala Thr Lys Ser Trp Asn
    290                 295                 300

Phe Ile Trp Leu Thr Asp Ser Glu Leu Lys Gly Lys Ser Glu Ser Ile
305                 310                 315                 320

Asp Ile Tyr Ser Ile Asp Asn Glu Met Thr Arg Lys Ser Ser Gly Gly
                325                 330                 335

Leu Glu Ile Ala Arg Asn Ile Gly His Tyr Leu Glu Arg Val Gly Asp
            340                 345                 350

Arg Gln
```

<210> SEQ ID NO 6
<211> LENGTH: 351
<212> TYPE: PRT
<213> ORGANISM: artificial sequence
<220> FEATURE:
<223> OTHER INFORMATION: Oa-351

<400> SEQUENCE: 6

```
Met Lys Arg Leu Thr Tyr Ile Ser Lys Phe Ser Arg Pro Leu Ser Gly
1               5                   10                  15

Asp Glu Ile Glu Ala Ile Gly Arg Ile Ser Ser Gln Lys Asn Gln Gln
            20                  25                  30

Ala Asn Val Thr Gly Val Leu Leu Cys Leu Asp Gly Ile Phe Phe Gln
        35                  40                  45

Ile Leu Glu Gly Glu Ala Glu Lys Ile Asp Arg Ile Tyr Glu Arg Ile
50                  55                  60

Leu Ala Asp Glu Arg His Thr Asp Ile Leu Cys Leu Lys Ser Glu Val
65                  70                  75                  80

Glu Val Gln Glu Arg Met Phe Pro Asp Trp Ser Met Gln Thr Ile Asn
                85                  90                  95

Leu Asp Glu Asn Thr Asp Phe Leu Ile Arg Pro Ile Lys Val Leu Leu
            100                 105                 110

Gln Thr Leu Thr Glu Ser His Arg Ile Leu Glu Lys Tyr Thr Gln Pro
        115                 120                 125

Ser Ile Phe Lys Ile Ile Ser Gln Gly Thr Asn Pro Leu Asn Ile Arg
130                 135                 140

Pro Lys Ala Val Glu Lys Ile Val Phe Phe Ser Asp Ile Val Ser Phe
145                 150                 155                 160

Ser Thr Phe Ala Glu Lys Leu Pro Val Glu Glu Val Val Ser Val Val
                165                 170                 175

Asn Ser Tyr Phe Ser Val Cys Thr Ala Ile Ile Thr Arg Gln Gly Gly
            180                 185                 190

Glu Val Thr Lys Phe Ile Gly Asp Cys Val Met Ala Tyr Phe Asp Gly
        195                 200                 205

Asp Cys Ala Asp Gln Ala Ile Gln Ala Ser Leu Asp Ile Leu Met Glu
210                 215                 220

Leu Glu Ile Leu Arg Asn Ser Ala Pro Glu Gly Ser Pro Leu Arg Val
225                 230                 235                 240

Leu Tyr Ser Gly Ile Gly Leu Ala Lys Gly Lys Val Ile Glu Gly Asn
                245                 250                 255

Ile Gly Ser Glu Leu Lys Arg Asp Tyr Thr Ile Leu Gly Asp Ala Val
            260                 265                 270

Asn Val Ala Ala Arg Leu Glu Ala Leu Thr Arg Gln Leu Ser Gln Ala
        275                 280                 285

Leu Val Phe Ser Ser Glu Val Lys Asn Ser Ala Thr Lys Ser Trp Asn
290                 295                 300

Phe Ile Trp Leu Thr Asp Ser Glu Leu Lys Gly Lys Ser Glu Ser Ile
305                 310                 315                 320

Asp Ile Tyr Ser Ile Asp Asn Glu Met Thr Arg Lys Ser Ser Gly Gly
                325                 330                 335

Leu Glu Ile Ala Arg Asn Ile Gly His Tyr Leu Glu Arg Val Gly
            340                 345                 350

<210> SEQ ID NO 7
<211> LENGTH: 348
<212> TYPE: PRT
<213> ORGANISM: artificial sequence
<220> FEATURE:
<223> OTHER INFORMATION: Oa-348

<400> SEQUENCE: 7

Met Lys Arg Leu Thr Tyr Ile Ser Lys Phe Ser Arg Pro Leu Ser Gly
1               5                   10                  15
```

Asp Glu Ile Glu Ala Ile Gly Arg Ile Ser Ser Gln Lys Asn Gln Gln
            20                  25                  30

Ala Asn Val Thr Gly Val Leu Leu Cys Leu Asp Gly Ile Phe Phe Gln
        35                  40                  45

Ile Leu Glu Gly Glu Ala Glu Lys Ile Asp Arg Ile Tyr Glu Arg Ile
50                  55                  60

Leu Ala Asp Glu Arg His Thr Asp Ile Leu Cys Leu Lys Ser Glu Val
65                  70                  75                  80

Glu Val Gln Glu Arg Met Phe Pro Asp Trp Ser Met Gln Thr Ile Asn
                85                  90                  95

Leu Asp Glu Asn Thr Asp Phe Leu Ile Arg Pro Ile Lys Val Leu Leu
            100                 105                 110

Gln Thr Leu Thr Glu Ser His Arg Ile Leu Glu Lys Tyr Thr Gln Pro
        115                 120                 125

Ser Ile Phe Lys Ile Ile Ser Gln Gly Thr Asn Pro Leu Asn Ile Arg
130                 135                 140

Pro Lys Ala Val Glu Lys Ile Val Phe Phe Ser Asp Ile Val Ser Phe
145                 150                 155                 160

Ser Thr Phe Ala Glu Lys Leu Pro Val Glu Glu Val Val Ser Val Val
                165                 170                 175

Asn Ser Tyr Phe Ser Val Cys Thr Ala Ile Ile Thr Arg Gln Gly Gly
            180                 185                 190

Glu Val Thr Lys Phe Ile Gly Asp Cys Val Met Ala Tyr Phe Asp Gly
        195                 200                 205

Asp Cys Ala Asp Gln Ala Ile Gln Ala Ser Leu Asp Ile Leu Met Glu
210                 215                 220

Leu Glu Ile Leu Arg Asn Ser Ala Pro Glu Gly Ser Pro Leu Arg Val
225                 230                 235                 240

Leu Tyr Ser Gly Ile Gly Leu Ala Lys Gly Lys Val Ile Glu Gly Asn
                245                 250                 255

Ile Gly Ser Glu Leu Lys Arg Asp Tyr Thr Ile Leu Gly Asp Ala Val
            260                 265                 270

Asn Val Ala Ala Arg Leu Glu Ala Leu Thr Arg Gln Leu Ser Gln Ala
        275                 280                 285

Leu Val Phe Ser Ser Glu Val Lys Asn Ser Ala Thr Lys Ser Trp Asn
290                 295                 300

Phe Ile Trp Leu Thr Asp Ser Glu Leu Lys Gly Lys Ser Glu Ser Ile
305                 310                 315                 320

Asp Ile Tyr Ser Ile Asp Asn Glu Met Thr Arg Lys Ser Ser Gly Gly
                325                 330                 335

Leu Glu Ile Ala Arg Asn Ile Gly His Tyr Leu Glu
            340                 345

<210> SEQ ID NO 8
<211> LENGTH: 1098
<212> TYPE: DNA
<213> ORGANISM: artificial sequence
<220> FEATURE:
<223> OTHER INFORMATION: Oa-366

<400> SEQUENCE: 8
atgaagagac tgacatacat ttccaagttt tcccgcccac tgtccggaga cgagatcgaa        60
gctattggca ggatcagctc ccagaagaac cagcaggcaa atgtgactgg ggtcctgctg       120
tgcctggacg gaattttctt tcagatcctg gagggcgaag ccgagaagat tgatcggatc       180

-continued

| | | | | | |
|---|---|---|---|---|---|
| tacgaaagaa | tcctggctga | cgagaggcac | acagatattc | tgtgtctgaa | aagtgaagtg | 240 |
| gaggtccagg | aacgcatgtt | ccctgattgg | tcaatgcaga | caatcaacct | ggacgagaat | 300 |
| actgattttc | tgattcgccc | aatcaaggtg | ctgctgcaga | ccctgacaga | agccatcga | 360 |
| atcctggaga | agtatactca | gccctccatt | ttcaaaatca | tttctcaggg | gaccaaccca | 420 |
| ctgaatatcc | ggcccaaggc | tgtggaaaaa | attgtcttct | ttagcgacat | cgtgtccttc | 480 |
| tctacctttg | cagagaagct | gcctgtggag | gaagtggtct | ccgtggtcaa | cagctacttt | 540 |
| tccgtgtgca | ctgccatcat | taccagacag | ggcggggagg | tgacaaaatt | catcggcgat | 600 |
| tgcgtcatgg | cttattttga | cggggattgt | gcagaccagg | ccattcaggc | ttctctggat | 660 |
| atcctgatgg | aactggagat | tctgcgaaat | tcagcacctg | agggaagccc | tctgagagtg | 720 |
| ctgtactctg | ggatcggact | ggccaagggc | aaagtgattg | aagcaacat | cgggagtgag | 780 |
| ctgaagcggg | actatacaat | cctgggcgat | gccgtgaatg | tcgccgctag | gctggaagca | 840 |
| ctgactcgcc | agctgagcca | ggccctggtg | ttctctagtg | aggtcaagaa | ctctgccacc | 900 |
| aaaagttgga | attttatctg | gctgacagac | agcgaactga | aggggaaatc | cgagtcaatc | 960 |
| gacatctact | ccattgataa | cgaaatgacc | agaaaatcaa | gcggaggcct | ggagattgcc | 1020 |
| aggaatatcg | gacactatct | ggagagagtg | ggagatagac | agccttcaca | gattttttgga | 1080 |
| gtcaagagcc | tgcccctg | | | | | 1098 |

<210> SEQ ID NO 9
<211> LENGTH: 350
<212> TYPE: PRT
<213> ORGANISM: Beggiatoa sp.
<220> FEATURE:
<221> NAME/KEY: MISC_FEATURE
<222> LOCATION: (1)..(350)
<223> OTHER INFORMATION: bPAC-photoactivated adenylyl cyclase

<400> SEQUENCE: 9

```
Met Met Lys Arg Leu Val Tyr Ile Ser Lys Ile Ser Gly His Leu Ser
1               5                   10                  15

Leu Glu Glu Ile Gln Arg Ile Gly Lys Val Ser Ile Lys Asn Asn Gln
            20                  25                  30

Arg Asp Asn Ile Thr Gly Val Leu Leu Tyr Leu Gln Gly Leu Phe Phe
        35                  40                  45

Gln Ile Leu Glu Gly Glu Asn Glu Lys Val Asp Lys Leu Tyr Lys Lys
    50                  55                  60

Ile Leu Val Asp Asp Arg His Thr Asn Ile Leu Cys Leu Lys Thr Glu
65                  70                  75                  80

Tyr Asp Ile Thr Asp Arg Met Phe Pro Asn Trp Ala Met Lys Thr Ile
                85                  90                  95

Asn Leu Asn Glu Asn Ser Glu Leu Met Ile Gln Pro Ile Lys Ser Leu
            100                 105                 110

Leu Gln Thr Ile Thr Gln Ser His Arg Val Leu Glu Lys Tyr Met Pro
        115                 120                 125

Ala Arg Val Ile Tyr Leu Ile Asn Gln Gly Ile Asn Pro Leu Thr Val
    130                 135                 140

Glu Pro Gln Leu Val Glu Lys Ile Ile Phe Ser Asp Ile Leu Ala
145                 150                 155                 160

Phe Ser Thr Leu Thr Glu Lys Leu Pro Val Asn Glu Val Val Ile Leu
                165                 170                 175

Val Asn Arg Tyr Phe Ser Ile Cys Thr Arg Ile Ile Ser Ala Tyr Gly
```

```
                  180                 185                 190
Gly Glu Val Thr Lys Phe Ile Gly Asp Cys Val Met Ala Ser Phe Thr
            195                 200                 205

Lys Glu Gln Gly Asp Ala Ala Ile Arg Thr Ser Leu Asp Ile Ile Ser
            210                 215                 220

Glu Leu Lys Gln Leu Arg His His Val Glu Ala Thr Asn Pro Leu His
225                 230                 235                 240

Leu Leu Tyr Thr Gly Ile Gly Leu Ser Tyr Gly His Val Ile Glu Gly
            245                 250                 255

Asn Met Gly Ser Ser Leu Lys Met Asp His Thr Leu Leu Gly Asp Ala
            260                 265                 270

Val Asn Val Ala Ala Arg Leu Glu Ala Leu Thr Arg Gln Leu Pro Tyr
            275                 280                 285

Ala Leu Ala Phe Thr Ala Gly Val Lys Lys Cys Cys Gln Ala Gln Trp
            290                 295                 300

Thr Phe Ile Asn Leu Gly Ala His Gln Val Lys Gly Lys Gln Glu Ala
305                 310                 315                 320

Ile Glu Val Tyr Thr Val Asn Glu Ala Gln Lys Tyr Tyr Asp Thr Leu
            325                 330                 335

Gln Ile Thr Gln Leu Ile Arg Gln Thr Leu Glu Asn Asp Lys
            340                 345                 350

<210> SEQ ID NO 10
<211> LENGTH: 396
<212> TYPE: PRT
<213> ORGANISM: Euglena gracilis
<220> FEATURE:
<221> NAME/KEY: MISC_FEATURE
<222> LOCATION: (1)..(396)
<223> OTHER INFORMATION: a part of an alpha chain of photoactivated
      adenylyl cyclase; corresponds to amino acids 466 to 1003 of entire
      sequence with 3 peptide sequences omitted as depicted in Figure 1
<220> FEATURE:
<221> NAME/KEY: MISC_FEATURE
<222> LOCATION: (309)..(310)
<223> OTHER INFORMATION: location of amino acids 775-839 of entire
      sequence omitted as depicted in Figure 1
<220> FEATURE:
<221> NAME/KEY: MISC_FEATURE
<222> LOCATION: (333)..(334)
<223> OTHER INFORMATION: location of amino acids 864-894 of entire
      sequence omitted as depicted in Figure 1
<220> FEATURE:
<221> NAME/KEY: MISC_FEATURE
<222> LOCATION: (344)..(345)
<223> OTHER INFORMATION: location of amino acids 906-951 of entire
      sequence omitted as depicted in Figure 1

<400> SEQUENCE: 10

Gln Leu Ile Thr Leu Thr Tyr Ile Ser Gln Ala Ala His Pro Met Ser
1               5                   10                  15

Arg Leu Asp Leu Ala Ser Ile Gln Arg Ile Ala Phe Ala Arg Asn Glu
            20                  25                  30

Ser Ser Asn Ile Thr Gly Ser Leu Leu Tyr Val Ser Gly Leu Phe Val
            35                  40                  45

Gln Thr Leu Glu Gly Pro Lys Gly Ala Val Val Ser Leu Tyr Leu Lys
        50                  55                  60

Ile Arg Gln Asp Lys Arg His Lys Asp Val Val Ala Val Phe Met Ala
65                  70                  75                  80

Pro Ile Asp Glu Arg Val Tyr Gly Ser Pro Leu Asp Met Thr Ser Ala
            85                  90                  95
```

```
Thr Glu Glu Met Leu Ala Thr Phe Pro Pro Leu Gln Asp Val Leu Ser
            100                 105                 110

Gln Leu Ala Lys Ser Phe Ile Ser Leu Glu Thr Tyr Val Pro Ser Thr
            115                 120                 125

Val Val Arg Tyr Leu Thr Ala Gly Asn Asn Pro Arg Asn Leu Gln Pro
            130                 135                 140

Val Ser Val Glu Val Val Met Leu Ala Thr Asp Ile Cys Ser Phe Thr
145                 150                 155                 160

Pro Leu Ser Glu Lys Cys Ser Leu Thr Glu Val Trp Thr Ile Cys Asn
                165                 170                 175

Thr Phe Ile Asp Ala Cys Thr Ser Ala Ile Cys Asn Glu Gly Gly Glu
                180                 185                 190

Val Ile Lys Leu Ile Gly Asp Cys Val Thr Ala Tyr Phe Pro Pro Thr
                195                 200                 205

Gly Ala Asp Asn Ala Val His Ala Cys Gln Glu Ile Val Ser Phe Cys
                210                 215                 220

Ala Gln Leu Arg Asp Ala Phe His Asp Val Leu Asp Cys Arg Ser Val
225                 230                 235                 240

Val Ala Cys Gly Val Gly Leu Asp Phe Gly Gln Val Ile Met Ala Gln
                245                 250                 255

Cys Gly Ser Leu Gly Met Thr Glu Phe Val Val Ala Gly Glu Val Ser
                260                 265                 270

Ala Arg Val Met Glu Val Glu Ala Leu Thr Arg Glu Ala Gly Arg Ala
                275                 280                 285

Ile Val Ile Thr Glu Pro Val Ala Asp Arg Leu Ser Pro Lys Leu Arg
                290                 295                 300

Asp Thr Gly Ile Val Lys Val Arg Pro Pro Gly Arg Thr Asn Ser Val
305                 310                 315                 320

Ser Ser Tyr Thr Pro Asp Pro Asn Glu Ala Leu Asp Pro Asp Asp Arg
                325                 330                 335

Leu Asp Leu Gly Arg Met Leu Gln Gln Val Leu Asp Leu Ser Asn Asn
                340                 345                 350

Pro Gly Leu Thr Lys Val Ile Ala Leu Lys Arg Leu Ile Lys His Asn
                355                 360                 365

Thr Gln Val Arg Glu Ile Leu Leu Asn Gly Thr Arg Ile Ala Pro Thr
                370                 375                 380

Glu Gln Arg Lys Leu Gln Ser Ser Met Asn Val Asn
385                 390                 395
```

PHOTOACTIVATED ADENYLYL CYCLASE

CROSS REFERENCE TO RELATED APPLICATIONS

This application is the National Stage of International Application No. PCT/JP2020/016461, filed Apr. 14, 2020, and claims benefit of Japanese Patent Application No. 2019-129374 filed on Jul. 11, 2019, the full contents of all of which are hereby incorporated by reference in their entirety.

REFERENCE TO A SEQUENCE LISTING

The instant application contains a sequence listing which has been submitted in ASCII format via EFS-Web and is hereby incorporated by reference in its entirety. Said ASCII copy, created on Apr. 24, 2025 is named 046884_000217_SL edited 04242025_ST25.txt and is 31,196 bytes in size.

TECHNICAL FIELD

The present invention relates to photoactivated adenylyl cyclase.

BACKGROUND ART

In recent years, a technique for controlling biological functions with light using optogenetics has been actively used in the fields of medicine and physiology. In this technique, optical probes (for example, enzymes or ion channels) that exert a biological function in a living body by light illumination are provided in a target site (for example, in a specific tissue or cell) in a living body and are illuminated with light to artificially control the biological function.

Photoactivated adenylyl cyclase (PAC) is known as an optical probe. Photoactivated adenylyl cyclase is a protein that is activated by light to produce cyclic adenosine monophosphate (cAMP) and has a BLUF (sensor of Blue Light Using FAD) domain and a cyclase catalytic domain. The BLUF domain is a domain to which FAD or FMN binds, and is involved in sensing blue light using FAD. The cyclase catalytic domain is a domain converting ATP into cAMP. PAC genes have been found in various organisms (for example, Non-Patent Literature 1). Photoactivated adenylyl cyclase derived from Oscillatoria (OaPAC) of cyanobacteria is a cAMP-regulating optical probe suitable for medical application, because: it is a homodimer that can be easily expressed in human cells; its crystal structure is disclosed; and it has a good expression compatibility with mammalian cell lines.

CITATION LIST

Non-Patent Literature

[Non-Patent Literature 1] Iseki et al., Nature, VOL. 415, pp. 1047-1051, Feb. 28, 2002

SUMMARY OF INVENTION

Technical Problem

Photoactivation efficiency of a wild-type OaPAC protein is low, and illumination with strong light is required for photoactivation of the OaPAC protein. For this reason, there is a possibility that photodamage will be caused in living bodies expressing the wild-type OaPAC protein due to light illumination.

The present invention has been made in consideration of the above-described problem, and an object of the present invention is to provide a novel photoactivated adenylyl cyclase having a higher photoactivation efficiency compared to a wild-type OaPAC protein.

Solution to Problem

As a result of the study, the present inventors have found that the photoactivation efficiency of an OaPAC protein is improved by deleting a certain number of amino acid residues from the C-terminus of the wild-type OaPAC protein, thus leading to realization of the present invention. Since the C-terminus of an OaPAC protein is a site completely different from the BLUF domain and the Cyclase catalytic domain thought to be important for exerting a PAC activity, the findings of the present inventors that the C-terminus of an OaPAC protein and its vicinity affect the photoactivation efficiency are surprising.

The present invention relates to [1] to [5] below.

[1] A protein having a photoactivated adenylyl cyclase activity, the protein consisting of the amino acid sequence of SEQ ID No. 1 with 1-18 amino acid residues deleted from a C-terminus, or an amino acid sequence having 90% or more sequence identity therewith.

[2] The protein according to [1] above, wherein a number of amino acid residues deleted from the C-terminus of the amino acid sequence of SEQ ID No. 1 is 5 to 7.

[3] A nucleic acid encoding the protein according to [1] or [2] above.

[4] A vector comprising the nucleic acid according to [3] above.

[5] A transformant with the vector according to [4] above introduced thereto.

In addition, the present invention also relates to [6] and [7] below.

[6] A method for producing the protein according to [1] or [2] above, comprising culturing the transformant according to [5] above.

[7] A method for improving photoactivation efficiency of adenylyl cyclase, comprising deleting 1-18 amino acid residues from a C-terminus of a photoactivated adenylyl cyclase, wherein the photoactivated adenylyl cyclase is derived from Oscillatoria.

Advantageous Effects of Invention

According to the present invention, a novel photoactivated adenylyl cyclase having a higher photoactivation efficiency compared to a wild-type OaPAC protein is provided.

In addition, according to the present invention, photoactivated adenylyl cyclase having a wide variety of photoactivation efficiencies is provided. Since a desirable light intensity of illumination light used for photoactivation varies depending on how photoactivated adenylyl cyclase is used, variations in photoactivation efficiency are required. For example, in a case where cultured cells with photoactivated adenylyl cyclase introduced are handled on a Petri dish in a general laboratory, if the photoactivation efficiency of the photoactivated adenylyl cyclase is too high, the adenylyl cyclase may be photoactivated by ceiling light in the room before performing illumination with a predetermined light source. On the other hand, in a case where photoactivated adenylyl cyclase is introduced into cells in a deep site of a living body where light barely reaches, if the photoactivation efficiency of the photoactivated adenylyl cyclase is low, light with a sufficient intensity for photoactivation may not reach the cells so that the photoactivated adenylyl cyclase cannot be activated. According to the present invention, photoactivated adenylyl cyclase having a wide variety of photoactivation efficiencies, capable of being applied to various situations, is provided, and therefore it is possible to cope with such various situations.

BRIEF DESCRIPTION OF DRAWINGS

FIG. 1 is an alignment of amino acid sequences of an OaPAC (Oa-366; SEQ ID No. 1) protein, photoactivated adenylyl cyclase derived from sulfur bacterium *Beggiatoa* (*Beggiatoa* sp.) (bPAC; SEQ ID No. 9), and a part of an α chain of photoactivated adenylyl cyclase of *Euglena gracilis* (PACαC; SEQ ID No. 10). Amino acid residues in white surrounded by a red frame are amino acid residues conserved in photoactivated adenylyl cyclase of various organisms.

DESCRIPTION OF EMBODIMENTS

Figure 2:
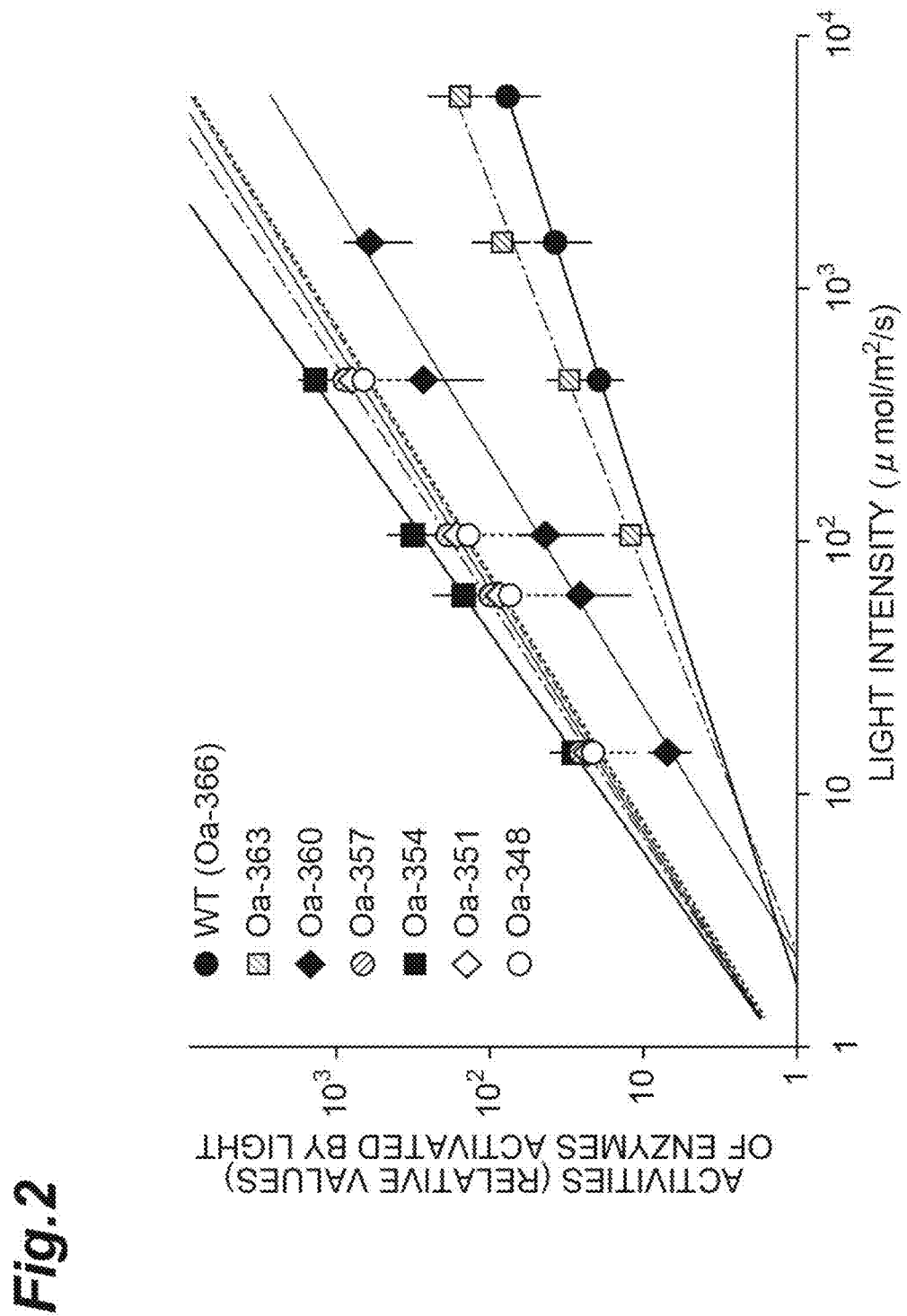
FIG. 2 is a graph showing photoactivation efficiency of wild-type and mutant-type OaPAC proteins.

A protein according to one embodiment of the present invention has a photoactivated adenylyl cyclase activity (hereinafter, referred to as a PAC activity), and consists of the amino acid sequence of SEQ ID No. 1 with 1-18 amino acid residues deleted from the C-terminus, or an amino acid sequence having 90% or more sequence identity therewith. The photoactivated adenylyl cyclase activity herein refers to an adenylyl cyclase activity exerted (namely, activated) by light illumination. The amino acid sequence of SEQ ID No. 1 is an amino acid sequence of a wild-type OaPAC protein (Oa-366 protein) of a cyanobacterium *Oscillatoria acuminata*. The C-terminus herein refers to the very end of the terminus on a side terminated by a free carboxy group, out of both termini of a protein. For example, an amino acid residue at the C-terminus of the amino acid sequence of SEQ ID No. 1, consisting of 366 amino acid residues, is a leucine residue which is the 366th amino acid residue.

More specifically, the protein according to the present embodiment may consist of an amino acid sequence obtained by deleting 1-18, 2-18, 3-18, 5-18, 6-18, 8-18, 9-18, or 5-7 amino acid residues from the C-terminus of the amino acid sequence of SEQ ID No. 1, or an amino acid sequence having 90% or more sequence identity therewith. The number of amino acid residues deleted from the C-terminus of the amino acid sequence of SEQ ID No. 1 may be 1, 2, 3, 4, 5, 6, 7, 8, 9, 10, 11, 12, 13, 14, 15, 16, 17, or more, and may be 18, 17, 16, 15, 14, 13, 12, 11, 10, 9, 8, 7, 6, 5, 4, 3, 2, or less. In a case where the number of amino acid residues deleted from the C-terminus is 8 to 18, the photoactivation efficiency of a protein is particularly high. On the other hand, in a case where the number of amino acid residues deleted from the C-terminus is 5 to 7, the photoactivation efficiency of a protein is moderate compared to a case where the number of amino acid residues deleted is 8 to 18 or 1 to 4. Since photoactivated adenylyl cyclase having moderate photoactivation efficiency is also not known in other organisms in the related art, the amino acid sequence of SEQ ID No. 1 with 5-7 amino acid residues are deleted from the C-terminus or an amino acid sequence having 90% or more sequence identity therewith is significantly useful.

The protein according to the present embodiment may consist of the amino acid sequence of SEQ ID No: 2, SEQ ID No: 3, SEQ ID No: 4, SEQ ID No: 5, SEQ ID No: 6, or SEQ ID No: 7. These amino acid sequences are amino acid sequences respectively obtained by deleting 364th to 366th, 361st to 366th, 358th to 366th, 355th to 366th, 352nd to 366th, and 349th to 366th amino acid residues from the amino acid sequence of SEQ ID No. 1. The protein according to the present embodiment may consist of an amino acid sequence having 90% or more sequence identity with the amino acid sequence of any of SEQ ID No: 2 to SEQ ID No: 7. The details of the amino acid sequences of SEQ ID No: 1 to SEQ ID No: 7 are shown in Table 1. Hereinafter, proteins consisting of the amino acid sequences of SEQ ID No: 1, SEQ ID No: 2, SEQ ID No: 3, SEQ ID No: 4, SEQ ID No: 5, SEQ ID No: 6, and SEQ ID No: 7 may be respectively referred to as an Oa-366 protein, an Oa-363 protein, an Oa-360 protein, an Oa-357 protein, an Oa-354 protein, an Oa-351 protein, and an Oa-348 protein.

TABLE 1

| | Position of amino acid deletion in WT OaPAC | Number of amino acid residues deleted from C-terminus | Amino acid sequence near C-terminus (from 349$^{th}$) |
|---|---|---|---|
| WT OaPAC (Oa-366) (SEQ ID NO. 1) | — | 0 | RVGDRQPSQIFGVKSLPL |
| Oa-363 (SEQ ID NO. 2) | 364th to 366th | 3 | RVGDRQPSQIFGVKS |
| Oa-360 (SEQ ID NO. 3) | 361st to 366th | 6 | RVGDRQPSQIFG |
| Oa-357 (SEQ ID NO. 4) | 358th to 366th | 9 | RVGDRQPSQ |
| Oa-354 (SEQ ID NO. 5) | 355th to 366th | 12 | RVGDRQ |
| Oa-351 (SEQ ID NO. 6) | 352nd to 366th | 15 | RVG |
| Oa-348 (SEQ ID NO. 7) | 349th to 366th | 18 | — |

Specifically, the sequence identity may be 90%, 91%, 92%, 93%, 94%, 95%, 96%, 97%, 98%, 99%, or more. The above-described amino acid sequence of SEQ ID No. 1 with 1-18 amino acid residues deleted from the C-terminus according to the present embodiment may further have one or more mutations selected from the group consisting of substitution, deletion, insertion, and addition of amino acid residues, to the extent that does not impair a higher photoactivation efficiency (namely, a higher efficiency of a PAC activity) compared to that of the wild-type OaPAC protein, more specifically to the extent that does not impair a higher photoactivation efficiency compared to that of the wild-type photoactivated adenylyl cyclase derived from *Oscillatoria acuminata*. For example, a mutation that adds the same amino acid residues as those deleted from the C-terminus of the amino acid sequence of SEQ ID No. 1 to the C-terminus negates improvement in photoactivation efficiency due to the deletion of amino acid residues from the C-terminus, and therefore, such a mutation is not preferable. The number of amino acid residues after the 348th amino acid residue of the amino acid sequence of SEQ ID No. 1 with 1-18 amino acid residues deleted from the C-terminus may or may not be coincident with the number of amino acid residues after the amino acid residue corresponding to the above-described 348th amino acid residue of an amino acid sequence having 90% or more sequence identity with the amino acid sequence of SEQ ID No. 1 with 1-18 amino acid residues deleted from the C-terminus.

Figure 1:
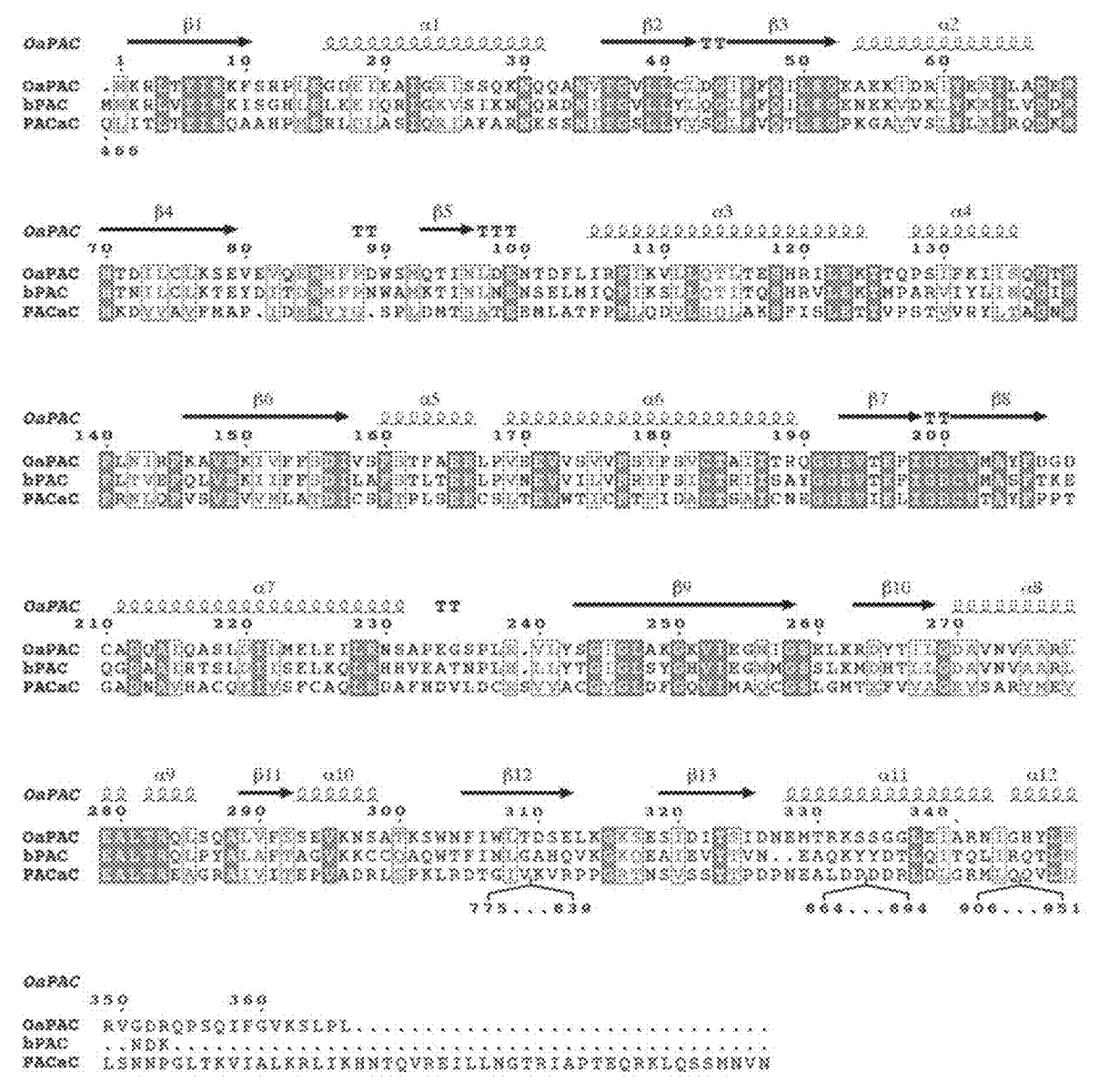

FIG. 1 is an alignment of amino acid sequences of an OaPAC (Oa-366; SEQ ID No. 1) protein, photoactivated adenylyl cyclase of *Beggiatoa* sp. (bPAC; SEQ ID No. 9), and a part of an α chain of photoactivated adenylyl cyclase of *Euglena gracilis* (PACαC; SEQ ID No. 10). In FIG. 1, amino acid residues in white surrounded by a red frame are amino acid residues conserved in photoactivated adenylyl cyclase of various organisms. Since conserved amino acid residues are important in exerting a PAC activity, these amino acid residues are not mutated in the present embodiment. That is, the protein according to the present embodiment has no mutation in amino acid residues corresponding to Leu4, Tyr6, Ile7, Ser8, Ser15, Ile22, Asn30, Asn34, Thr36, Gly37, Leu39, Leu40, Gly44, Phe46, Gln48, Leu50, Glu51, Gly52, Tyr61, Ile64, Asp67, Arg69, His70, Arg85, Glu99, Pro107, Leu112, Ser118, Leu122, Glu123, Tyr125, Glu137, Asn139, Pro140, Pro145, Val148, Glu149, Asp156, Ile157, Phe160, Glu165, Lys166, Glu171, Val172, Asn177, Cys183, Thr184, Ile187, Gly191, Gly192, Glu193, Val194, Lys196, Ile198, Gly199, Asp200, Cys201, Val202, Ala204, Phe206, Asp212, Ala214, Ile221, Leu228, Arg229, Gly244, Gly246, Leu247, Gly250, Val252, Ile253, Gly258, Ser259, Gly269, Glu279, Ala280, Leu281, Thr282, Arg283, Ala288, Val295, Gly315, Tyr323, Leu337, and Leu347 of the amino acid sequence of SEQ ID No. 1.

In the protein according to the present embodiment, amino acid residues corresponding to undeleted amino acid residues among 349th to 366th amino acid residues of the amino acid sequence of SEQ ID No. 1 may or may not be substituted with other amino acid residues, and the type of substitution may be conservative substitution. For example, an amino acid residue having an aliphatic side chain may be substituted with a glycine, alanine, valine, leucine, or isoleucine residue, an amino acid residue having an aliphatic hydroxyl side chain may be substituted with a serine or threonine residue, an amino acid residue having an aromatic side chain may be substituted with a phenylalanine, tyrosine, tryptophan, or histidine residue, an amino acid residue having a basic side chain may be substituted with a lysine, arginine, or histidine residue, an amino acid residue having an acidic side chain may be substituted with an aspartic acid or glutamic acid residue, an amino acid residue having an amide-containing side chain may be substituted with an asparagine or glutamine residue, and an amino acid residue having a sulfur-containing side chain may be substituted with cysteine or methionine.

The photoactivation efficiency of the protein according to the present embodiment may be evaluated by a method commonly used for evaluating enzyme activity, and more specifically by a method commonly used for evaluating a PAC activity of photoactivated adenylyl cyclase. For example, since the protein according to the present embodiment produces cAMP by photoactivation, the photoactivation efficiency may be evaluated based on the amount of cAMP produced upon light illumination. The method for evaluating photoactivation efficiency based on the amount of cAMP is not particularly limited, and the photoactivation efficiency may be evaluated, for example, by preparing cells that express the protein according to the present embodiment and a reporter protein of cAMP, and monitoring the amount of cAMP produced in the cells through the amount of luminescence of the reporter protein. The reporter protein of cAMP is not particularly limited, and may be selected as appropriate, depending on the types of cells. The reporter protein may be, for example, a protein obtained using commercially available products such as pGloSensor 22F cAMP Plasmid (Promega). pGloSensor 22F cAMP is modified luciferase in which a cAMP-binding domain is inserted into firefly luciferase, and when cAMP binds to the cAMP-binding domain, its structure changes to react with luciferin, whereby the amount of luminescence increases.

The protein according to the present embodiment may be obtained, for example, by introducing a vector that comprises a nucleic acid encoding the protein into a host cell, and culturing the obtained transformant. The details of the nucleic acid, the vector, and the transformant will be described below. The culture method is not particularly limited, and the types of culture medium and the culture conditions may be selected or adjusted as appropriate, depending on the types of host cells.

A nucleic acid according to one embodiment of the present invention encodes the protein according to the above-described embodiment. A nucleic acid consisting of the nucleotide sequence of SEQ ID No: 8 is obtained by optimizing codons of a wild-type OaPAC gene for mammals and encodes the wild-type OaPAC protein (Oa-366 protein). The nucleic acid according to the present embodiment may be, for example, a nucleic acid obtained by deleting a certain nucleotide(s) from the nucleotide sequence of the wild-type OaPAC gene or the nucleotide sequence of SEQ ID No: 8, or maybe a nucleic acid consisting of a nucleotide sequence having 90% or more sequence identity therewith. The deleted nucleotide(s) may be a nucleotide(s) encoding 1 to 18 consecutive amino acid residues counting from the amino acid residue at the C-terminus (where an amino acid residue at the C-terminus is counted as 1) of the wild-type OaPAC protein (Oa-366 protein).

A vector according to one embodiment of the present invention comprises the nucleic acid according to the above-described embodiment. A vector into which the nucleic acid is inserted may be any vector, as long as it can express the protein encoded by the nucleic acid in a host cell. The vector may be, for example, a transient vector or a stable expression vector, and may be a plasmid vector or a virus vector. A vector into which the nucleic acid is inserted may include various sequences such as restriction enzyme sites, control sequences for expressing inserted genes, antibiotic resistance genes, and sequences for selecting transformants. For example, commercially available products such as a pEB-Multi-Hygro vector (FUJIFILM Wako Chemical Corporation) may be used as the vector into which the nucleic acid is inserted.

A transformant according to the present embodiment may be obtained by introducing the vector according to the above-described embodiment into a host cell. In the present specification, transformants are not limited to transformed prokaryotic cells, and refer to any cells with foreign genes introduced thereto. That is, host cells are not particularly limited, and may be prokaryotic cells such as *Escherichia coli* and *Bacillus subtilis*, or may be eukaryotic cells such as yeast or animal cells. Animal cells may be, for example, mammalian cells, and more specifically mouse cells or human cells. The method for introducing the vector is not limited, and a transient or stable transformation or transfection method commonly used in genetic engineering may be selected as appropriate, depending on the types of host cells.

EXAMPLES

(1) Preparation of OaPAC Expression Construct

An OaPAC gene (Oa-366 gene; SEQ ID No: 8) having codons optimized for mammals was synthesized. In addition, specific nucleotides were deleted from the nucleotide sequence of Oa-366 using a general gene recombination technique to obtain mutant-type OaPAC genes Oa-363, Oa-360, Oa-357, Oa-354, Oa-351, and Oa-348. The positions of the deleted nucleotides are shown in Table 2.

TABLE 2

| Genes | Position of nucleotide deletion in OaPAC gene (SEQ ID No: 8) | Encoded protein |
|---|---|---|
| Oa-366 (SEQ ID No: 8) | — | SEQ ID No: 1 |
| Oa-363 | 1090th to 1098th | SEQ ID No: 2 |
| Oa-360 | 1081st to 1098th | SEQ ID No: 3 |
| Oa-357 | 1072nd to 1098th | SEQ ID No: 4 |
| Oa-354 | 1063rd to 1098th | SEQ ID No: 5 |
| Oa-351 | 1054th to 1098th | SEQ ID No: 6 |
| Oa-348 | 1045th to 1098th | SEQ ID No: 7 |

The Oa-366 gene together with 2A and RFP genes were inserted into pEBMulti-Hygro (FUJIFILM Wako Chemical Corporation) to obtain a bicistronic expression construct pEBMulti-Hygro-RFP-2A-Oa-366 of the Oa-366 gene and the RFP gene. 2A is a 2A peptide for equally expressing a mutant-type OaPAC gene and an RFP gene, and the RFP gene is a gene encoding Rudolph-RFP (ATUM), a mutant of a red fluorescent protein. Expression constructs were similarly prepared for other mutant-type OaPAC genes.

(2) Establishment of cAMP Reporter Expression Cell Line

A GloSensor (trademark)-22F cAMP gene (Promega) was inserted into a mammalian expression vector pEBMulti-Neo (FUJIFILM Wako Chemical Corporation). The obtained pEBMulti-Neo-GloSensor-22F cAMP plasmid was introduced into human embryonic kidney cells HEK293 (KAC Co., Ltd.) by lipofection using FuGENE (registered trademark) HD (Promega) to establish a cell line stably expressing GloSensor-22F cAMP.

(3) Preparation of OaPAC Expression Cells

OaPAC expression constructs were respectively introduced into GloSensor-22F cAMP-expressing HEK293 by an electroporation method using an Ingenio (registered trademark) Electroporation Kit with 0.4 cm Cuvettes (Mirus Bio LLC) and a Gene Pulser Electroporation System (Bio-Rad Laboratories, Inc., application conditions: 260 V, 950 µF) to obtain HEK293 that express wild-type or mutant-type OaPAC protein and GloSensor-22F cAMP protein. Since the levels of expression of OaPAC proteins are equal to the level of expression of RFP protein due to the action of a 2A-peptide, the levels of expression of OaPAC proteins were confirmed by the fluorescence intensity of RFP.

(4) Photoactivation of OaPAC

Each OaPAC-expressing HEK293 was seeded in a 35 mm culture plate (BioCoat (trademark) Collagen I, Corning) and cultured in 2 mL of a medium (DMEM high glucose with 10% FBS and 4 mM L-glutamine, Thermo Fisher Scientific K.K.). Each medium was replaced with a $CO_2$-independent medium (Thermo Fisher Scientific K.K.) several hours before illuminating the cells with light, and GloSenser cAMP Reagent (Promega) was added thereto at a final concentration of 0.12 mg/mL. Several hours later, the following illumination experiment was performed in a darkroom using an inverted fluorescence microscope (Eclipse TE-300, Nikon Corporation) with an EM-CCD camera (ImagEM C9100-23B, Hamamatsu Photonics K.K.) and a blue LED (LXML-PR01-0425, Luxeon Rebel, Philips Lumileds) attached thereto.

OaPAC-expressing HEK293 was illuminated with blue light with light intensities of $1.5\times10$ µmol/m²/s, $6.1\times10$ µmol/m²/s, $1.1\times10^2$ µmol/m²/s, $4.5\times10^2$ µmol/m²/s, $1.5\times10^3$ µmol/m²/s, and $5.7\times10^3$ µmol/m²/s for 20 seconds each. Light illumination at a next intensity was carried out after waiting for increase in activity due to the current light illumination to completely subside. The luminescence of GloSensor-22F cAMP emitted from HEK293 was captured by the EM-CCD camera, and the luminescence intensity was quantitatively determined from the obtained image using ImageJ software (http://imagej.nih.gov/ij).

FIG. 2 is a graph showing photoactivation efficiency of wild-type and mutant-type OaPAC proteins. The numerical values on the vertical axis specifically show the amount of luminescence of GloSensor-22F cAMP, but since this is a numerical value that is uniquely dependent on the concentration of cAMP produced by the OaPAC proteins activated by light, the title of the axis is indicated as activities (relative values) of enzymes activated by light. As shown in FIG. 2, the Oa-357 protein, the Oa-354 protein, the Oa-351 protein, and the Oa-348 protein which were obtained by respectively deleting 9, 12, 15, and 18 amino acid residues from the C-terminus of the amino acid sequence of SEQ ID No. 1 showed particularly high photoactivation efficiency compared to that of the wild-type OaPAC protein (Oa-366 protein). On the other hand, although the photoactivation efficiency of the Oa-363 protein obtained by deleting 3 amino acid residues from the C-terminus was clearly improved compared to the wild-type OaPAC protein, its improvement was minor compared to the above-described four types of OaPAC. The Oa-360 protein obtained by deleting 6 amino acid residues from the C-terminus of the amino acid sequence of SEQ ID No. 1 showed moderate photoactivation efficiency among the mutant-type OaPAC proteins but a higher photoactivation efficiency compared to that of the wild-type OaPAC protein. As described above, since a desirable light intensity of illumination light used for photoactivation varies depending on how OaPAC proteins are used, variations in photoactivation efficiency are required. Accordingly, it can be stated that any of the above-described mutant-type proteins is useful.

The invention claimed is:

1. A protein having a photoactivated adenylyl cyclase activity, the protein consisting of an amino acid sequence of SEQ ID No. 1, wherein said protein comprising amino acid residues deleted from a C-terminus of the amino acid sequence of SEQ ID No. 1, wherein the number of the amino acid residues deleted is 1, 2, 3, 4, 5, 6, 7, 8, 9, 10, 11, 12, 13, 14, 15, 17 or 18, and wherein the resulting amino acid sequence having 90% or more sequence identity with the amino acid sequence of SEQ ID No. 1 with the same number of amino acid residues deleted from the C-terminus.

2. The protein according to claim 1, wherein a number of amino acid residues deleted from the C-terminus of the amino acid sequence of SEQ ID No. 1 is 5 to 7.

3. A nucleic acid encoding the protein according to claim 1.

4. A vector comprising the nucleic acid according to claim 3.

5. A transformant with the vector according to claim 4 introduced thereto.

6. A nucleic acid encoding the protein according to claim 2.

7. A vector comprising the nucleic acid according to claim 6.

8. A transformant with the vector according to claim 7 introduced thereto.

* * * * *